United States Patent [19]

Schmidt

[11] 4,224,622
[45] Sep. 23, 1980

[54] APPARATUS FOR ELIMINATING AMPLITUDE MODULATION INTERFERENCE IN CONICALLY SCANNING RADARS

[76] Inventor: Jerry D. Schmidt, 7363 New Horizon Ave., Enon, Ohio 45323

[21] Appl. No.: 168,738

[22] Filed: Aug. 3, 1971

[51] Int. Cl.³ .................. G01S 7/36; G01S 13/68
[52] U.S. Cl. .................... 343/7.4; 343/18 E
[58] Field of Search .................. 343/7.4, 18 E

[56] References Cited

U.S. PATENT DOCUMENTS

| | | | |
|---|---|---|---|
| 2,464,258 | 3/1949 | Prichard | 343/18 E |
| 2,946,049 | 7/1960 | Stotz | 343/7.4 |
| 3,095,565 | 6/1963 | Schelisch | 343/18 E |
| 3,281,837 | 10/1966 | Van Hijfte | 343/18 E |

Primary Examiner—Malcolm F. Hubler
Attorney, Agent, or Firm—Joseph E. Rusz; James S. Shannon

[57] ABSTRACT

The signal received through the fixed nonscanning transmitting lobe of the antenna in LORO conically scanning radar systems is demodulated to derive the interfering amplitude modulation. This modulation is then used to apply an amplitude modulation to the signal received through the scanning lobe that is equal and opposite in phase to the interfering modulation, thereby cancelling the interfering modulation and leaving only the modulation due to the conical scanning. Applications to both mechanically and electrically scanned systems are described.

3 Claims, 11 Drawing Figures

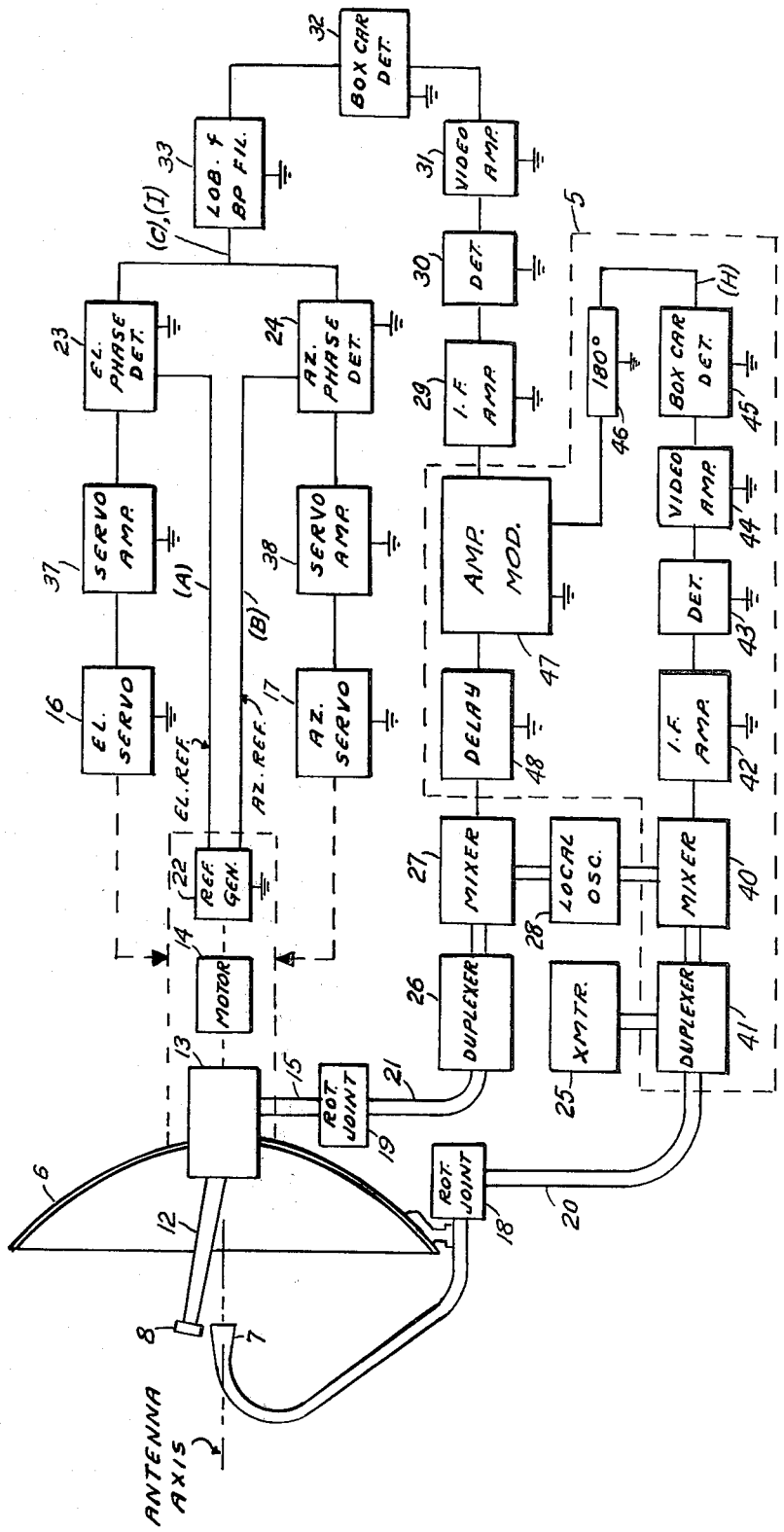

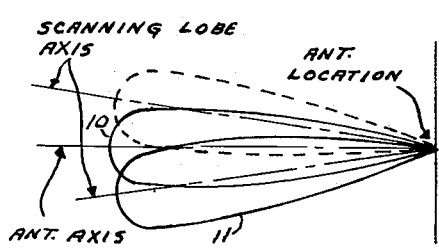
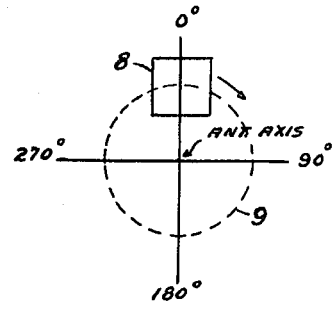
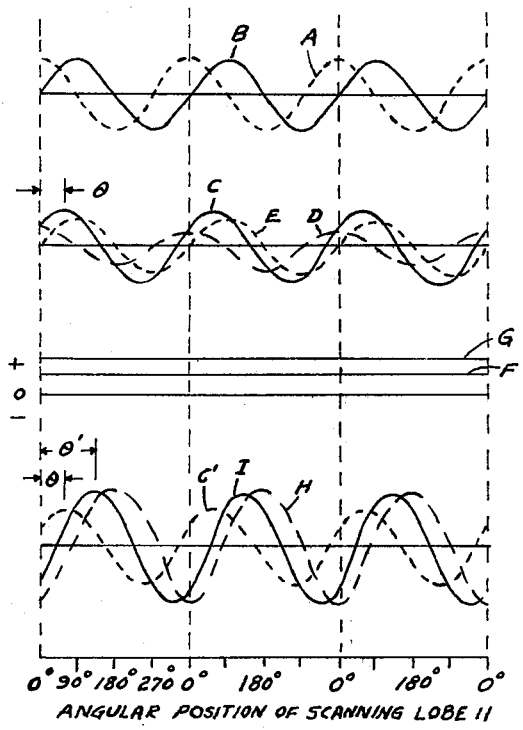
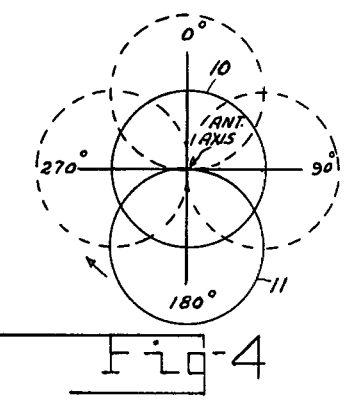
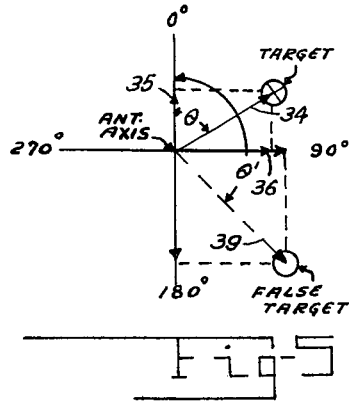
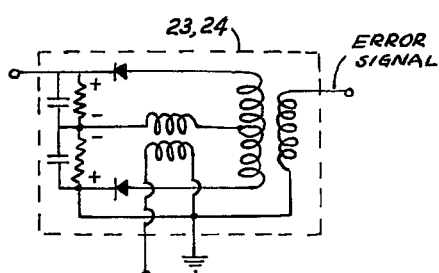
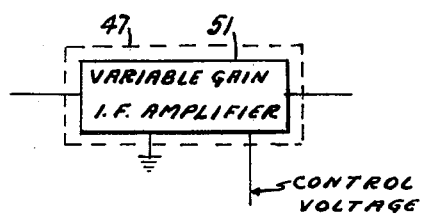

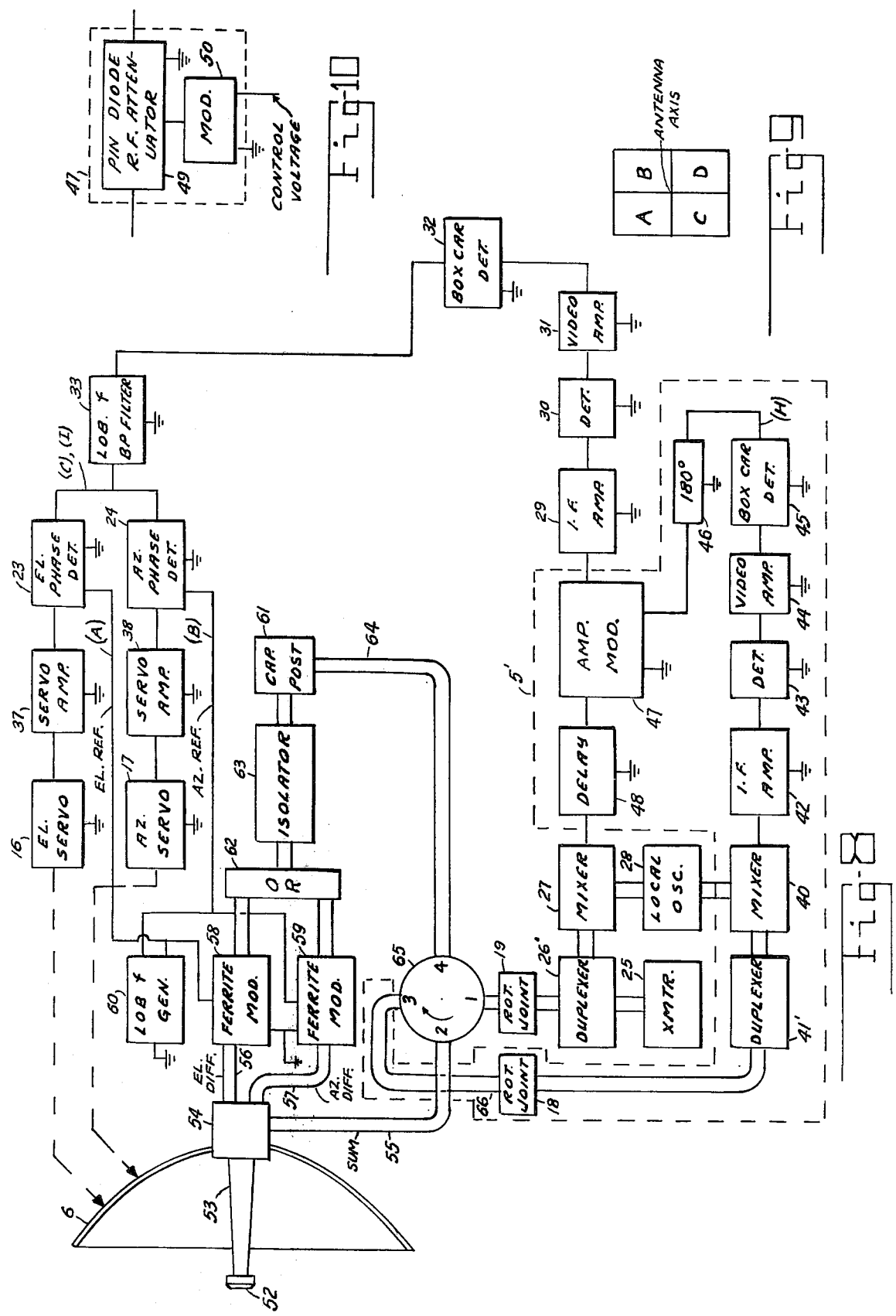

APPARATUS FOR ELIMINATING AMPLITUDE MODULATION INTERFERENCE IN CONICALLY SCANNING RADARS

BACKGROUND OF THE INVENTION

The invention relates to conically scanning radar tracking systems and particularly to countercountermeasures for such systems.

In conically scanning tracking radar systems the return from the target is received through an antenna lobe which makes a small angle with the antenna axis and is rotated at constant speed about the antenna axis. This produces an amplitude modulation of the received signal at the rotational or lobing frequency for any target that is displaced from the extended antenna axis. The amplitude of the modulation is proportional to the magnitude of the displacement and its phase gives the direction of the displacement. After detection, the modulation is applied as an error signal to antenna aiming circuits which act to reduce the error signal to zero by bringing the extended antenna axis into coincidence with the target, thus locking on the target.

Any extraneous amplitude modulation of the return signal that reaches the antenna aiming circuits contributes to the error signal and, if the resultant signal is sufficiently different in amplitude or phase, or both, from the true error signal, can cause the antenna to break the tracking lock on the true target and seek a false target. The aiming circuit is usually preceded by a bandpass filter centered on the lobing frequency to exclude modulations at other than the lobing frequency. Also, conically scanning systems are usually of the LORO (scan-on-receive-only) type in order not to reveal the lobing frequency. Nevertheless, any extraneous modulation of the return signal which has a component at the lobing frequency can modify the error signal and possibly break the tracking lock. The usual countermeasure against conically scanning tracking radars is the imposition of an amplitude modulation at the lobing frequency on the return signal from the target. Target scintillation is another cause of extraneous amplitude modulation of the return signal that may interfere with the tracking function.

SUMMARY OF THE INVENTION

The purpose of the invention is to eliminate from the return pulse signal any amplitude modulation that is not due to the conical scanning. In LORO systems, a separate transmitting lobe is used that is fixed and symmetrical to the antenna axis, the conically scanning lobe being used only for reception. If the fixed lobe is also used as an additional receiving lobe the signal it receives has all of the modulation present on the signal reaching the receiver by way of the conically scanning lobe with the exception of the modulation due to the conical scanning. Therefore, the modulation on the signal received through the fixed lobe represents the interfering component of the modulation on the signal received through the scanning lobe. In accordance with the invention, the pulse signal received through the fixed lobe is detected to derive its amplitude modulation which is then used to apply an equal and oppositely phased amplitude modulation to the pulse signal received through the scanning lobe. This eliminates the interfering or extraneous amplitude modulation leaving only the modulation due to the conical scanning, which is the true error signal, for application to the antenna aiming circuits.

BRIEF DESCRIPTION OF THE DRAWING

FIG. 1 illustrates the application of the invention to a tracking system in which the conical scanning is mechanically produced, FIG. 2 illustrates the antenna patterns in a conically scanning system, FIG. 3 illustrates the rotation of the antenna feed in the system of FIG. 1, FIG. 4 illustrates the fixed and rotating lobes of a conically scanning antenna as used in a LORO system, FIG. 5 is a diagram illustrating the tracking operation of a conically scanning system, FIG. 6 illustrates a suitable phase detector for use in the antenna summing circuits of a conically scanning tracking system, FIG. 7 shows waveforms illustrating the operation of a conically scanning tracking system both in the absence and in the presence of interfering modulation, FIG. 8 illustrates the application of the invention to a tracking system in which the conical scanning is electrically produced, FIG. 9 illustrates the antenna feed in the system of FIG. 8, and FIGS. 10 and 11 illustrate suitable amplitude modulators for use in the systems of FIGS. 1 and 8.

DETAILED DESCRIPTION

FIG. 1 illustrates the invention as applied to a conically scanning tracking radar system of the LORO (lobe-on-receive-only) type in which the conical scan of the antenna is mechanically produced. That part of the system lying outside the area 5 defined by the broken line is conventional; that inside the area constitutes the modification in accordance with the invention. The conventional system will be described first:

The antenna comprises a parabolic reflector 6 having a fixed feed 7 centered on the antenna axis, and a revolving feed 8 which is displaced from the antenna axis and rotates thereabout at a constant rate causing the center of the feed to describe a circle 9 (FIG. 3) centered on the antenna axis. Normally the fixed feed 7 is used for transmission only, the radiation pattern being fixed and symmetrical to the antenna axis as represented by lobe 10 in FIG. 2. In LORO systems the revolving feed 8 is used for reception only. The offset of this feed causes the axis of its pattern to be angularly displaced from the antenna axis in a direction opposite to the direction of the offset, as represented by lobe 11 in FIG. 2, which, when the feed is rotated as described, produces the desired conical scanning of the receiving lobe. Assuming feed 8 to rotate clockwise as seen from the center of reflector 6, the receiving lobe 11 as seen from the same point also rotates clockwise and is 180° displaced from the feed as shown in FIG. 4. The feed 8 forms the end of a waveguide 12 which connects with a mechanism located within block 13 and driven at constant speed by motor 14 for producing the desired rotation. Preferably the mechanism maintains the feed alignment constant throughout the rotational cycle. Mechanims for this purpose are well known in the art, an example being given in the Radiation Laboratory Series, Vol. 26, Radar Scanners and Radomes, McGraw-Hill, 1948, page 65. Block 13 also contains the necessary waveguide fittings to complete the microwave circuit from feed 8 to the antenna output waveguide 15. The antenna is pivotally mounted (not shown) so that it can be rotated in elevation and azimuth by elevation and azimuth servos 16 and 17, respectively. Rotating joint structures represented by blocks 18 and 19 serve to connect the transmitting and receiving feeds to the stationary waveguides 20 and 21. Motor 14 also drives reference generator 22 which is a two-phase alternating current generator producing two alternating output voltages in phase quadrature. One of these voltages, represented by waveform A in FIG. 7, is applied to elevation phase detector 23 as the elevation reference, and the other, represented by waveform B, is applied to azimuth phase detector 24 as the azimuth reference. In the example shown, the phasing of the reference voltages is such that elevation reference A is at its positive peak when lobe 11 is at 0° (feed 8 at 180°) and azimuth reference B is at its positive peak when lobe 11 is at 90° (fed 8 at 270°). Motor 14 rotates feed 8 and reference generator 22 at a constant speed which may be, for example, in the range 1800-4800 rpm, with the result that the lobing frequency and likewise the frequency of reference waves A and B has a value in the range 30-80 Hz.

Considering the operation of the system of FIG. 1, transmitter 25 applies short pulses of radio frequency energy at a constant repetition rate through rotary joint 18 to feed 7 of the antenna for radiation in accordance with the axial pattern represented by lobe 10 in FIG. 2. Reflections from a target illuminated by this radiation are received by the rotating feed 8 in accordance with the conically scanning receiving lobe 11 of FIG. 2 and appear as pulses of radio frequency energy in the antenna output waveguide 15. If the target is on the extended antenna axis the amplitude of the received pulses in waveguide 15 is independent of the rotational position of receiving lobe 11 and is therefore constant. However, if the target is displaced from the extended antenna axis the conical scanning results in an amplitude modulation of the pulses in waveguide 15 at the lobing frequency, the magnitude of which is directly related to the displacement of the target from the antenna axis and the phase of which relative to a predetermined reference phase indicates the direction of the displacement.

The received radio frequency pulses are applied through rotary joint 19 and duplexer 26 to mixer 27 where the radio frequency energy beats with the local oscillator 28 frequency to produce pulses of intermediate frequency energy at the mixer output. The duplexer serves to protect the mixer from the high level radio frequency energy that may be coupled into feed 8 from feed 7 during the transmitted pulses. Normally, in the unmodified system, the intermediate frequency pulses are applied directly to I.F. amplifier 29 and after amplification are detected in detector 30 which converts the intermediate frequency pulses into video pulses. These are in turn amplified in video amplifier 31. Any amplitude modulation present on the received radio frequency pulses is preserved in the video pulses at the output of the video amplifier. The boxcar detector 32 in effect gets rid of the video pulses and produces a smooth output wave corresponding to the video pulse amplitude modulation. This device is essentially a peak detector with a sufficient time constant in the output filter that the output voltage is a smooth wave following the peaks of the video pulses. This wave, or the lobing frequency component thereof if other frequencies are present, is passed by bandpass filter 33, centered on the lobing frequency. The output of filter 33, which is termed the tracking error signal, is applied to the error signal inputs of phase detectors 23 and 24 in parallel.

Wave C in FIG. 7 represents a typical tracking error signal such as would be produced with the target in the position shown in FIG. 5. The amplitude of the error signal is proportional to the vector 34. The phase of the error signal is measured from a preselected zero or reference phase. If the reference phase is defined as the phase of the error signal produced when the target lies on the upper or positive portion of the 0°-180° axis, which is also the phase of elevation reference A, then the error signal lags the reference phase by the angle $\theta$. The antenna aiming circuits operate in response to the error signal to reduce its value to zero by bringing the antenna axis into coincidence with the target. In the system disclosed, this is accomplished as follows:

The error signal C and the vector 34 which represents it may be resolved into two components: one in phase with the elevation reference A and represented by wave D and vector 35, and the other in phase with the azimuth reference B and represented by wave E and vector 36. Had the target been below rather than above 90°-270° axis, the phase of wave D and the direction of vector 35 would have been reversed. Similarly, had the target been to the left of the 0°-180° axis, the phase of wave E and the direction of vector 36 would have been reversed. The elevation phase detector 23 produces a direct current output that is proportional to the amplitude of the error signal component that is in phase with or 180° out of phase with the elevation reference A, the polarity of the output indicating which of the two phases is present. Thus, line F represents the output of elevation phase detector 23 due to the in-phase component D of the error signal. Similarly, line G represents the output of aximuth phase detector 24 due to the error signal component E which is in phase with the azimuth reference B. Phase detectors capable of operating in the above manner are well known in the art, an example being given in FIG. 6.

The direct current elevation and azimuth error signals from the phase detectors are amplified by servoamplifiers 37 and 38, which preserve the polarities of the error signals, and applied to elevation and azimuth servomotors 16 and 17 for aiming the antenna. These servos may be fixed field direct current motors in which the direction of rotation is determined by the polarity of the direct current energization. For the example illustrated in FIGS. 5 and 7, the elevation and azimuth servos would move the extended antenna axis upward and to the right until it coincides with the target, at which time the error signal would have been reduced to zero. Any tendency for the target to move away from the antenna axis generates an appropriate error signal causing the antenna axis to follow the target. In this manner the tracking system locks onto the target.

The usual countermeasure against a tracking radar of the above described type is the introduction, by a device aboard the target, of an amplitude modulation of the return signal that has the same frequency as the modulation produced by the conical scan, but generally a different amplitude and a different phase. Usually the device is a repeater that receives the radio frequency pulses from the tracking radar, amplifies and modulates them, and retransmits them otherwise unchanged to the tracking radar with a very small system delay. The repeated pulses therefore reach the tracking radar at essentially the same time as the reflected primary pulses; however, because of the energy added in the repeater, they swamp the primary pulses and in effect constitute the entire return signal. In addition to the modulation received in the repeater, the repeater pulses, except when the antenna axis and target are coincident, are also modulated by the conical scan so that the resultant modulation of the signal as received by the tracking radar is the vector sum of the countermeasure modulation and the scan modulation. The resultant modulation produces a false error signal which causes the antenna aiming circuits to direct the antenna away from the true target.

Considering the specific example illustrated in FIGS. 5 and 7, assume that the modulation applied to the return pulses by the countermeasure repeater is represented by wave H in FIG. 7. The modulation produced by the conical scanning is represented by wave C', which, except for amplitude, is the same as error signal C since the repeater is located at the target. The resultant modulation of the signal received by the tracking radar is the vector sum of the two modulations C' and H and is represented by wave I, which also represents the resultant error signal at the output of bandpass filter 33. This false error signal causes the antenna aiming circuits to direct the antenna axis away from the true target and toward a false target in the direction represented by vector 39 in FIG. 5.

The invention nullifies the effect of the countermeasure by cancelling from the received signal the amplitude modulation added by the countermeasure device, leaving only the modulation due to the conical scanning. To accomplish this, advantage is taken of the fact that the radio frequency energy received at the fixed transmitting feed 7 carries the countermeasure modulation but not the conical scanning modulation. Therefore the modulation derived from the signal received at feed 7 may be used to apply a modulation to the signal received at feed 8 that is equal and in phase opposition to the countermeasure modulation, thereby cancelling the countermeasure modulation from the received signal.

The apparatus added to the conventional tracking system for accomplishing the above result is shown within the area 5 of FIG. 1. Transmitter 25 and mixer 40 are coupled to feed 7 through duplexer 41 to permit both transmission and reception through this feed. The received radio frequency pulses with the countermeasure amplitude modulation are reduced to similarly modulated intermediate frequency pulses in mixer 40, amplified in intermediate frequency amplifier 42, reduced to amplitude modulated video pulses by detector 43 which are amplified in video amplifier 44. As in the case of the output of video amplifier 31, the boxcar detector 45 produces a smooth wave corresponding to the amplitude modulation of the video pulses. This wave represents the lobing frequency modulation imposed on the return signal by the countermeasure device at the target and therefore may also be represented by wave H in FIG. 7. After a phase reversal in element 46 the boxcar detector output is applied to amplitude modulator 47, interposed together with delay element 48 between mixer 27 and intermediate frequency amplifier 29 of the conventional system, for producing an amplitude modulation of the intermediate frequency pulses that is equal and opposite to that component of the total modulation attributable to the countermeasure device and represented by wave H of FIG. 7. The result is cancellation of the component H, leaving only the component C' which is the true error signal. The purpose of delay element 48 is to compensate for the additional delay introduced by elements 42-46 so as to establish an exact 180° relationship between the modulating signal from element 46 and the modulation component H of the intermediate frequency pulses.

Any device capable of amplitude modulating an intermediate frequency signal in accordance with an applied modulating voltage may be used for modulator 47. A preferred device for this purpose is a PIN modulator, illustrated in FIG. 10, comprising a PIN diode attenuator 49 and a modulator 50 for controlling the attenuation of element 49 in accordance with an applied control or modulating voltage. The attenuator 49 is essentially a section of transmission line shunted by one or more PIN diodes which act as low-reactance variable resistances with the resistance inversely proportional to the forward voltage or forward current. An increase in forward current therefore decreases the shunt resistance and increases the attentuation of the intermediate frequency pulses passing through the attenuator. Modulator 50 controls the forward current in accordance with an applied control or modulating voltage which in this case is the output of phase inverter 46. Modulators of the above type are well known in the art and are available commercially, an example being the 8730 Series PIN Modulator manufactured by Hewlett-Packard Co. Rather than an attenuator, an intermediate frequency amplifier 51 with instantaneous gain control could be used for modulator 47, as illustrated in FIG. 11. The gain of the amplifier is determined by the instantaneous value of the control voltage or modulating signal which, as before, is the output of phase inverter 46.

FIG. 8 illustrates the manner of applying the invention to a conically scanning LORO tracking radar in which the conical scan is electrically produced, rather than mechanically as in FIG. 1. As in FIG. 1, the apparatus contained within the area 5' constitutes the modification of the conventional electrically scanned system. Considering the conventional system first, the antenna feed 52 is fixed and has four ports A, B, C, and D symmetrical to the antenna axis and facing the reflector 6, the effective arrangement being as illustrated schematically in FIG. 9. The four ports are coupled through four waveguides within support 53 and a microwave network within rectangle 54 to sum waveguide 55, elevation difference waveguide 56, and azimuth difference waveguide 57. The microwave network is so designed that during reception the received energy in sum waveguide 55 is proportional to the sum of the energies received at the four ports, or A+B+C+D; the received energy in elevation difference waveguide 56 is proportional to (A+B)-(C+D); and the received energy in azimuth difference waveguide 57 is proportional to (A+C)-(B+D). The microwave network also has the property that the received radio frequency energy applied to elevation difference waveguide 56 is in phase with the sum energy applied to sum waveguide 55 when (A+B)-(C+D) is negative (target above the antenna axis) and is 180° out of phase with the sum energy with (A+B)-(C+D) is positive (target below the antenna axis), and the property that the received radio frequency energy applied to azimuth difference waveguide 57 lags the sum energy applied to the sum waveguide 55 by 90° when (A+C)-(B+D) is positive (target to the right of the antenna axis) and leads the sum energy by 90° when (A+C)-(B+D) is negative (target to the left of the antenna axis), the phase of the sum energy being unaffected by the target position. For transmission, pulses of radio frequency energy at the pulse repetition rate of the radar system are applied to sum waveguide 55 and their power is divided equally between the four ports by the microwave network. With respect to waveguide 55, the antenna pattern for both reception and transmission is fixed and symmetrical to the antenna axis. It is in all respects similar to the pattern of the antenna in FIG. 1 for feed 7 and may be represented by lobe 10 of FIG. 2. The high power pulses are produced in transmitter 25 and reach waveguide 55 via duplexer 26', rotary joint 19, and ports 1 and 2 of circulator 65.

The elevation difference signal and the azimuth difference signal are applied to ferrite modulators 58 and 59, respectively. The modulating signals are derived from lobing frequency generator 60 which produces two sine waves in phase quadrature at a frequency within the range 30–300 Hz. These waves are similar to the reference waves produced by reference generator 22 of FIG. 1, except for a possibly higher frequency, and likewise may be represented by waves A and B of FIG. 7. Wave A is applied as a modulating signal to elevation modulator 58 and as a reference wave to elevation phase detector 23. Similarly, wave B is applied as a modulating signal to azimuth modulator 59 and as a reference wave to azimuth phase detector 24.

The modulators 58 and 59 in effect multiply the amplitude of the radio frequency pulses received from waveguides 56 and 57 by a factor that varies sinusoidally between minimum and maximum values in accordance with the applied modulating waves A and B, thus producing an amplitude modulation of these pulses at the lobing frequency. The amplitude of this modulation is proportional to the amplitude of the radio frequency pulses at the modulator input. Therefore, since the amplitude of the elevation difference pulses is proportional to the displacement of the target above or below the antenna axis, the amplitude of the modulation of the modulator 58 output pulses is proportional to the elevation error; and, similarly, since the amplitude of the azimuth difference pulses is proportional to the displacement of the target to the right or left of the antenna axis, the amplitude of the modulation of the modulator 59 output pulses is proportional to the azimuth error. Although the modulations at this point give the magnitudes of the elevation and azimuth errors, they carry no information as to the directions of these errors. The directional information is generated at capacitive post 61 in the following manner:

The modulated pulse outputs of modulators 58 and 59 are applied through a suitable microwave OR circuit 62 and an isolator 63 to capacitive post 61. The isolator has the property of passing energy traveling in the direction toward the capacitive post and absorbing energy traveling in the direction away from the capacitive post. The capacitive post is a waveguide stub extending far enough into the guide to reflect half of the incident energy. Therefore, half of the energy from modulators 58 and 59 is reflected and absorbed in isolator 63 and half passes into waveguide 64. The received sum energy in waveguide 55 enters circulator 65 at port 2 and would normally exit at port 3. However, in the conventional system port 3 is terminated in a shorted section of waveguide which reflects all of the sum energy back into the circulator causing it to exit at port 4 and to travel through waveguide 64 to the capacitive post. Half of the sum energy passes the capacitive post and is absorbed by isolator 63; the other half is reflected back into waveguide 64.

As stated earlier, the elevation difference energy at the output of the microwave network in rectangle 54 is in phase with the sum energy when the target is above the antenna axis and 180° out of phase when below. The electrical lengths of the elevation difference circuit and the sum circuit between the microwave network and the capacitive post are made such as to preserve this phase relationship. Also, as stated earlier, the azimuth difference energy at the network leads the sum energy by 90° when the target is to the right of the center line and lags the sum energy by 90° when to the left. At the capacitive post the azimuth difference energy must be in phase with the sum energy when the target is to the right of the antenna axis and 180° out of phase when to the left. To effect this phase relationship the electrical length of the azimuth difference path between the microwave network and the capacitive post is made 90° longer than that of the elevation difference path. This may be accomplished by an appropriate increase in the length of waveguide 57 over the length of waveguide 56.

At the capacitive post 61 the modulated elevation difference pulses and the sum pulses add vectorially to produce an amplitude modulated radio frequency pulse signal in waveguide 64 constituting the elevation component of the received signal. If the elevation difference signal and the sum signal have the same radio frequency phase (target above the antenna axis) the modulation of the resultant signal is in phase with the modulation of the elevation difference signal and the elevation reference. On the other hand, if the elevation differences signal and the sum signal have opposite radio frequency phases (target below the antenna axis) the modulation of the resultant signal is 180° out of phase with modulation of the elevation difference signal and the elevation reference. Therefore the modulation of the elevation component gives both the magnitude and the direction of the elevation error. In a similar manner, the modulated azimuth difference pulses and the sum pulses add vectorially at the capacitive post to produce the azimuth component of the received signal the modulation of which gives both the magnitude and the direction of the azimuth error. Considering the specific example shown in FIG. 5, the modulation of the elevation and azimuth components may be represented by waves D and E of FIG. 7. The vector sum of the elevation and azimuth components gives to total received signal in waveguide 64. Its amplitude modulation is the vector sum of the elevation and azimuth component modulations and, for the example given, may be represented by wave C of FIG. 7. The total signal entering waveguide 64 from the capacitive post is therefore a series of radio frequency pulses amplitude modulated at the lobing frequency with the amplitude and phase of the modulation representing the magnitude and direction, respectively, of the antenna tracking error. It is identical in all respects to the signal in waveguide 15 of FIG. 1 so that the antenna in effect has a conically scanning receiving lobe such as represented by lobe 11 in FIG. 2. This signal reaches mixer 27 by way of ports 4 and 1 of circulator 65, rotating joint 19, and duplexer 26'. In the conventional system, the output of mixer 27 is applied to intermediate frequency amplifier 29. The operation of the conventional system from this point onward is identical to that already described for FIG. 1.

The application of the invention to the conventional electrically scanned system shown in FIG. 8 requires the addition of the elements contained within the area 5'. This includes the replacement of the above mentioned short at port 3 of circulator 5, which reflected all of the sum energy back into the circulator, with a termination that permits some of the sum energy to pass into waveguide 66 and thence through rotary joint 18 and duplexer 41' to mixer 40. The duplexer 41' may or may not be needed to protect mixer 40 depending upon the degree of isolation of port 3 from port 1 in the circulator. The sum signal, which is received in accordance with the fixed lobe of the antenna (lobe 10 of FIG. 2) contains all of the modulation of the received signal except that due to the conical scanning and is identical in all respects to the signal received at feed 7 in FIG. 1 and applied through rotary joint 18 and duplexer 41 to mixer 40 in that system. The operation of FIG. 8 starting with mixer 40 is identical to that already described in detail for FIG. 1.

While in the foregoing examples the interfering amplitude modulation has been described as a modulation imposed on the return signal by a countermeasure device, the systems will act in a similar manner to eliminate extraneous amplitude modulation of the return signal from any cause such, for example, as target scintillation. Also, the invention is not limited to use with LORO systems but may also be used when the scanning lobe is employed for transmission as well as reception. The conversion of FIG. 1 to the latter type requires only that the output of transmitter 25 be applied to duplexer 26 rather than to duplexer 41.

I claim:

1. In a radar tracking system having a directional antenna providing a conically scanning lobe, a receiving circuit including a detector for receiving return pulses of radio frequency energy from a target via said scanning lobe and for deriving their amplitude modulation, antenna aiming circuits associated with said antenna, and means for applying said amplitude modulation as an error signal to said antenna aiming circuits for tracking said target, apparatus for eliminating any component of said amplitude modulation not due to said conical scanning, said apparatus comprising: means for providing said antenna with a fixed lobe symmetrical to the axis of the conical scan, a receiving circuit including a detector for receiving return pulses of radio frequency energy from said target via said fixed lobe and for deriving their amplitude modulation, an amplitude modulator in the scanning lobe receiving circuit prior to the detector, and means for applying the amplitude modulation derived in the fixed lobe receiving circuit to said modulator adjusted in amplitude and phase as required to produce an amplitude modulation of the pulses received via said scanning lobe that is equal in amplitude and opposite in phase to said component, thereby cancelling said component.

2. Apparatus as claimed in claim 1 in which said antenna has a parabolic reflector, a mechanically rotated feed which provides said conically scanning lobe and which serves as an input to the scanning lobe receiving circuit, and a fixed feed which provides said fixed lobe and which serves as an input to the fixed lobe receiving circuit.

3. Apparatus as claimed in claim 1 in which said antenna has a parabolic reflector and a fixed feed having four ports symmetrically arranged to provide upper and lower pairs and right and left pairs relative to the reflector axis, means for dividing the energy received by said ports into sum energy proportional to the sum of the energies received by the four ports, elevation difference energy proportional to the difference in the energies received by said upper and lower pairs, and azimuth difference energy proportional to the difference in the energies received by said right and left pairs, means for amplitude modulating said elevation difference and azimuth difference energies in phase quadrature at a preselected lobing frequency, means for combining the modulated elevation difference and azimuth difference energies with said sum energy to produce the input to the scanning lobe receiving circuit, and means for extracting a fraction of said sum energy to produce input to the fixed lobe receiving circuit.

* * * * *